(12) United States Patent
Pschirer

(10) Patent No.: US 11,022,300 B2
(45) Date of Patent: Jun. 1, 2021

(54) IN-LINE ORIFICE

(71) Applicant: General Electric Company, Schenectady, NY (US)

(72) Inventor: James Darryl Pschirer, Enfield, CT (US)

(73) Assignee: General Electric Company, Schenectady, NY (US)

( * ) Notice: Subject to any disclaimer, the term of this patent is extended or adjusted under 35 U.S.C. 154(b) by 217 days.

(21) Appl. No.: 16/215,884

(22) Filed: Dec. 11, 2018

(65) Prior Publication Data

US 2020/0182454 A1    Jun. 11, 2020

(51) Int. Cl.
*F22B 37/74* (2006.01)
*G01F 1/42* (2006.01)

(52) U.S. Cl.
CPC .............. *F22B 37/74* (2013.01); *G01F 1/42* (2013.01)

(58) Field of Classification Search
CPC .................................. F22B 37/74; G01F 1/42
USPC ............................................................ 138/44
See application file for complete search history.

(56) References Cited

U.S. PATENT DOCUMENTS

| | | | |
|---|---|---|---|
| 2,829,673 A * | 4/1958 | Reese ................. | F16L 19/0218 138/44 |
| 4,555,129 A * | 11/1985 | Davlin ................. | F16L 25/023 285/136.1 |
| 5,490,545 A * | 2/1996 | Sokoloff ................. | A63F 7/045 138/40 |
| 5,937,909 A * | 8/1999 | Clauss ................. | F02M 59/466 138/43 |
| 6,442,966 B1 * | 9/2002 | Wiser ..................... | F25B 41/06 62/511 |
| 6,502,602 B1 * | 1/2003 | Stroup .................... | F04B 41/00 138/40 |
| 8,091,587 B1 * | 1/2012 | Schwartz ................. | F15D 1/04 138/44 |
| 8,216,009 B1 * | 7/2012 | Pelini .................... | B63H 20/08 440/61 R |
| 9,856,893 B2 * | 1/2018 | Goodwin ................. | F17D 1/20 |
| 9,926,759 B2 | 3/2018 | Colby | |
| 10,012,425 B2 * | 7/2018 | Dodson ..................... | B05B 1/04 |
| 2011/0297263 A1 * | 12/2011 | Atkins .................. | E03C 1/1222 138/44 |
| 2013/0037153 A1 * | 2/2013 | Schommer ................ | E03C 1/08 138/44 |
| 2013/0081730 A1 * | 4/2013 | Schwartz .................. | F15D 1/02 138/44 |

* cited by examiner

*Primary Examiner* — Craig M Schneider
*Assistant Examiner* — David R Deal
(74) *Attorney, Agent, or Firm* — Fletcher Yoder, P.C.

(57) ABSTRACT

An adaptor assembly includes: an adaptor piece including: a forged outer wall defining a substantially cylindrical shape; a through hole disposed at a top portion of the adaptor piece, the through hole defining an adaptor center cavity; a threaded portion disposed beneath the through hole; and a second hole disposed beneath the threaded portion. The adaptor assembly includes a hex socket including external threading. A diameter of the through hole is smaller than a diameter of the second hole. The hex socket is inserted through the second hole and screwed into the adaptor piece such that the external threading mates with the threaded portion.

20 Claims, 2 Drawing Sheets

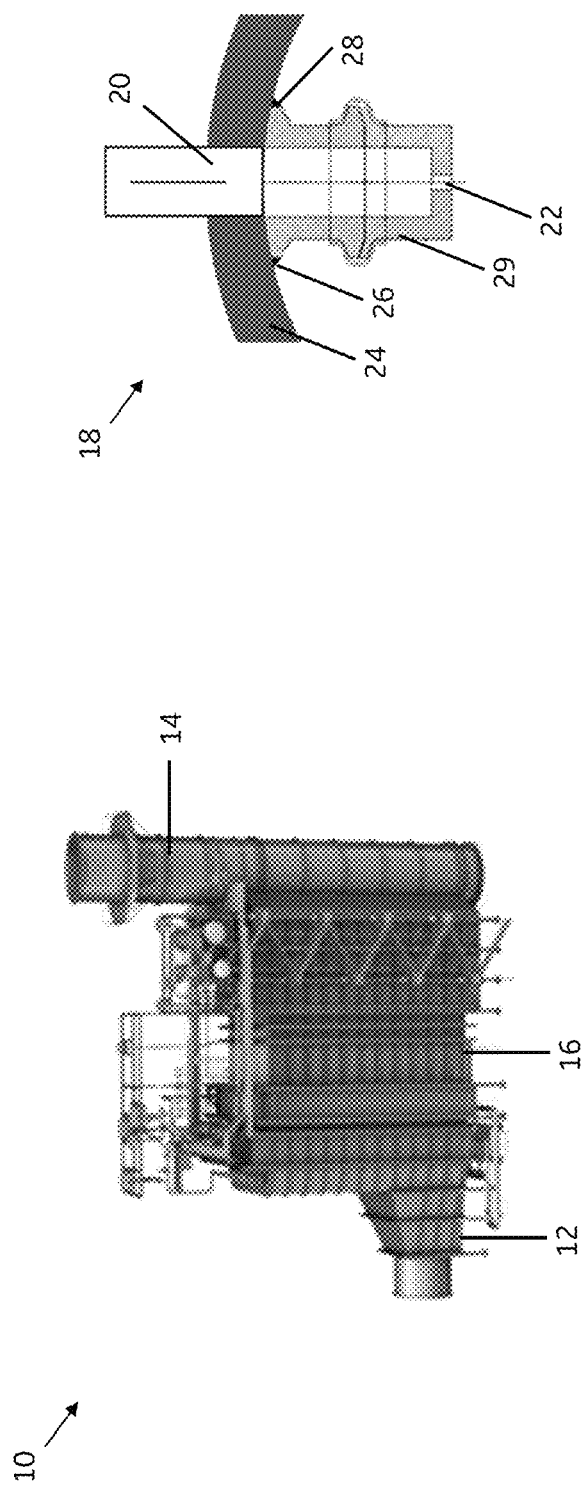

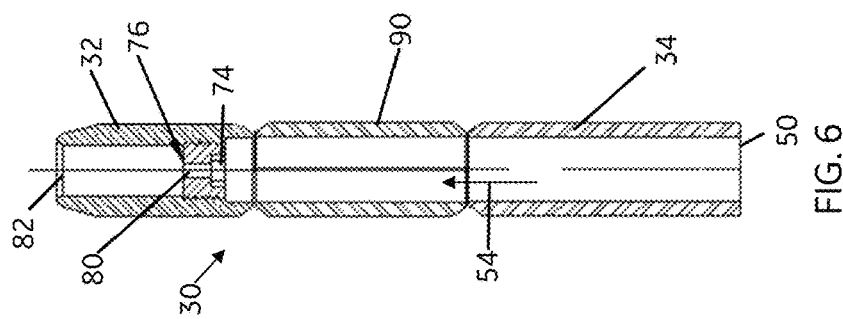
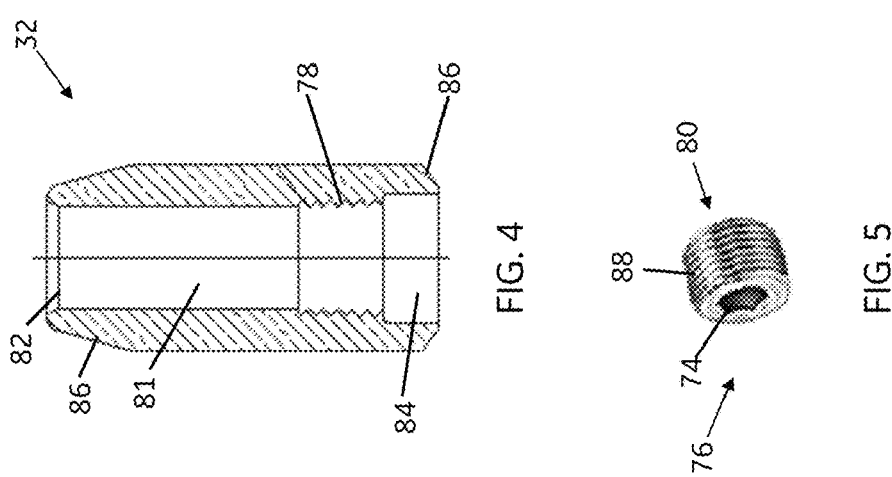
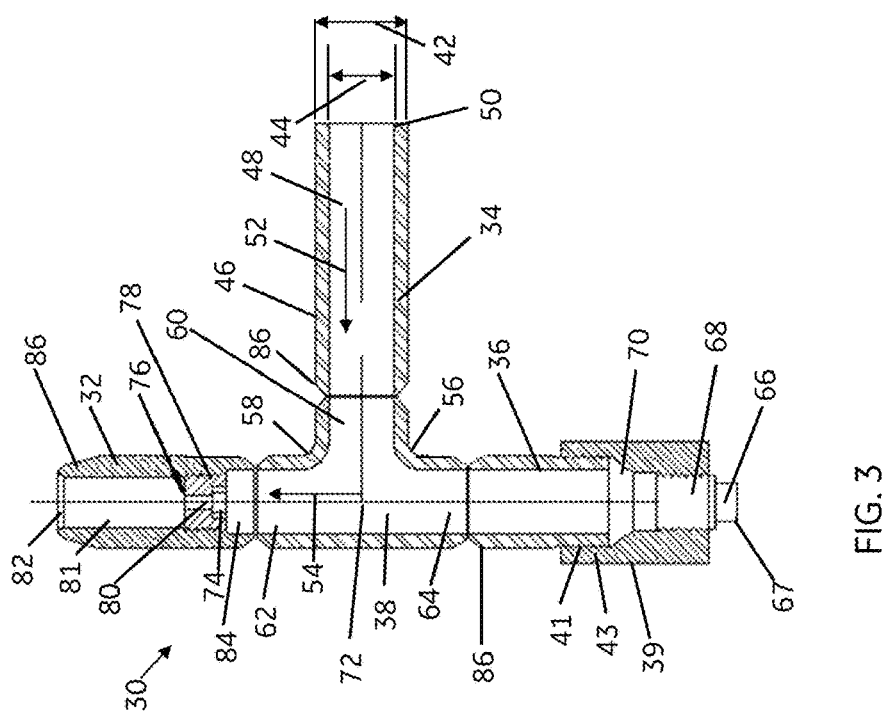

IN-LINE ORIFICE

BACKGROUND

The present subject matter relates generally to an orifice, and more specifically to a simplified in-line orifice and adaptor.

Heat recovery steam generators (HRSG), as well as boilers more generally, include several possible configurations including various arrangements of piping, orifices, baffles, flow conduits, and other components. Heat recovery steam generators use exhaust gases from gas turbine engines to produce steam at various pressures, temperatures, and flow rates for use in power-producing steam turbine generators, as well as for other processes and/or purposes (for example, at co-gen facilities).

Heat recovery steam generators may include high-pressure, intermediate-pressure, and low-pressure systems (referring to the pressure of the steam) which may include drums. Heat recovery steam generators (HRSG) may also be arranged in configurations that do not include the high pressure, intermediate-pressure, and/or low-pressure drums (i.e., "drum-less" systems). Once through HRSG units may include the same arrangement as other HRSG, but without, for example, the high-pressure drum. Such arrangements may result in enhanced thermal efficiency, as well as increased operational flexibility.

Once through HRSG may achieve such results by including configurations that allow for precise ranges of operating conditions (i.e., the desired steam pressures, temperatures, and flow rates) to be achieved within several portions of the HRSG. However, achieving precise ranges may involve fine-tuning of the HRSG design and/or configuration during the build and/or commissioning phase. In addition, multiple fine-tuning iterations may be required, potentially causing detrimental impacts on schedules and/or budgets.

BRIEF DESCRIPTION OF THE EMBODIMENTS

Aspects of the present embodiments are summarized below. These embodiments are not intended to limit the scope of the present claimed embodiments, but rather, these embodiments are intended only to provide a brief summary of possible forms of the embodiments. Furthermore, the embodiments may encompass a variety of forms that may be similar to or different from the embodiments set forth below, commensurate with the scope of the claims.

In one aspect, an adaptor assembly includes: an adaptor piece including: a forged outer wall defining a substantially cylindrical shape; a through hole disposed at a top portion of the adaptor piece, the through hole defining an adaptor center cavity; a threaded portion disposed beneath the through hole; and a second hole disposed beneath the threaded portion. The adaptor assembly includes a hex socket including external threading. A diameter of the through hole is smaller than a diameter of the second hole. The hex socket is inserted through the second hole and screwed into the adaptor piece such that the external threading mates with the threaded portion.

In another aspect, an orifice assembly includes: an inlet portion including an orifice inlet, the orifice inlet receiving at least one fluid; an adaptor portion disposed downstream of the inlet portion and receiving the fluid from the inlet portion. The adaptor portion further includes: a threaded portion disposed beneath the through hole; and a hex socket including external threading. The hex socket screws into the threaded portion such that the external threading mates with the threaded portion.

In another aspect, a heat recovery steam generator (HRSG) includes: at least one orifice assembly including: an adaptor portion receiving at least one fluid. The adaptor portion includes: a threaded portion disposed beneath the through hole; and a hex socket comprising external threading. The hex socket includes: a hexagonal recess disposed within a first end, and a through bore disposed within a second end. The second end is disposed at an opposite end of the hex socket from the first end.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 1 is a side schematic representation of a heat recovery steam generator (HRSG);

FIG. 2 is a side view representation of an exemplary orifice;

FIG. 3 is a side view of an in-line orifice assembly;

FIG. 4 is a side view of an adaptor piece;

FIG. 5 is an isometric view of a hex socket; and

FIG. 6 is a side view of an in-line orifice, according to aspects of the present embodiments.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

FIG. 1 illustrates an exemplary heat recovery steam generator (HRSG) 10. The HRSG 10 may include a gas inlet portion 12 for receiving exhaust gases from a gas turbine (not shown). The HRSG 10 may also include a body portion 16 including tubes, piping, baffles, and other components used to generate steam from the exhaust gases. The HRSG 10 may also include a stack 14 through which exhaust gases may exit after flowing through the HRSG 10. The HRSG 10 of FIG. 1 may be a conventional HRSG and/or a once-through HRSG, and as such, HRSG 10 may or may not include a high-pressure drum.

FIG. 2 illustrates an exemplary orifice 18 including a center tube 20 disposed within a wall 24. The wall 24 may be curved and/or planar. In addition, the wall 24 may be a wall of a pressure vessel, drum, wall, baffle, and/or other component. The orifice 18 may also include a bore 22 disposed at one end (for example a bottom end) of the center tube 20. The bore 22 may define a minimum flow area of the orifice 18. As such, the diameter and/or cross-sectional area of the bore 22 may determine the flow rate of fluid flowing through the orifice 18 at a given operating condition (i.e., at a given fluid pressure, fluid temperature, etc.). The orifice 18 may be coupled to the wall 24 via a first weld 26, a second weld 28, and/or other welds extending around an interface between an orifice wall 29 and wall 24. The wall 24 may be a wall of a pressure vessel in which case certain ASME standards (and/or other standards) may dictate specific technical requirements with which the first, second, and/or other welds 26, 28 must comply. In addition, the ASME standards (and/or other standards) may require that cutting through the weld and subsequently re-welding the orifice 18 (and/or a replacement orifice) to the wall 24 are the only means by which the orifice 18 may be replaced (i.e., per the pressure vessel standards).

FIG. 3 illustrates an in-line orifice 30 according to the embodiments disclosed herein. The in-line orifice 30 may include an adaptor portion 32, an inlet portion 34, an access portion 36, and a tee portion 38. The inlet portion 34 may include a substantially cylindrical tube 46 including an inner diameter 44, an outer diameter 42, and a flow passage 48. A fluid flow 52 may enter the inlet portion 34 at an upstream end 50 and flow through the cylindrical tube 45 toward the tee portion 38. The first flow 52 exits the inlet portion 34 and enters the tee portion 38 at a first leg 60 of the tee portion 38. The first leg 60 is coupled to the inlet portion 34 via weld, braze, adhesion, other attachment means, and/or via investment casting (i.e., both the tee portion 38 and inlet portion 34 being integrally cast simultaneously as a single piece).

Referring still to FIG. 3, the first flow 52 may turn about 90 degrees such that after entering the tee portion 38, it flows in a vertical direction 54 (or in a direction that is orthogonal to the direction in which it flows within the inlet portion 34). The fluid flows in a vertical direction 54 within the tee portion 38 to a second leg 62 of the tee. The second leg 62 may extend away from a center point 72 of the tee portion 38 in a direction that is orthogonal to the direction in which the first leg 60 extends away from the center point 72 of the tee portion 38. The second leg 62 is coupled to the adaptor portion 32 via welding, brazing, and/or other connection means. The tee portion 38 may also include a third leg 64 extending away from the center point 72 in a direction that is both linear with the vertical direction 54 (though oppositely directed), as well as orthogonal to the direction in which the first flow 52 flows within the inlet portion 34. The third leg 64 may be coupled to the access portion 36 via welding, brazing, adhesion, and/or other connection means. The tee portion 38 may also include a first chamfer 56 on an exterior portion at an intersection of the first leg 60 and third leg 64. The tee portion 38 may also include a second chamfer 58 on an exterior portion at an intersection of the first leg 60 and the second leg 62.

Still referring to FIG. 3, the access portion 36 may include external threading 41 at a bottom portion. The external threading 41 allows the access portion 36 to interface with a threaded reducing coupling 39 which may be coupled to the bottom of the access portion 36 via internal threading 43 disposed within the top portion of the threaded reducing coupling 39, the internal threading 43 interfacing with the external threading 41. The threaded reducing coupling 39 may include a plug 66 disposed within an access port 68. The plug 66 may be substantially cylindrical and may include external threading that interfaces with internal threading of the access port 68. The plug 66 may also include a square, hexagonal, and/or other-shaped cap 67 to allow for removal (i.e., using a wrench, for example). The threaded reducing coupling 39 may also include a reduction portion 70 disposed above the access port 68. The reduction portion 70 may include a first diameter at an interface with the access port 68, and a gradual transition to a second diameter at an interface with the access portion 36. The access portion may include both the threaded reducing coupling 39, as well as the features thereof 43, 70, 68, 67, 66.

Referring still to FIG. 3, the adaptor portion 32 may include a hex socket 76 disposed therein. The hex socket 76 may include external threading 88 (shown in FIG. 5) that interfaces with the internal threading 78 of the adaptor portion 32. The hex socket 76 may include a hexagonal recess 74 at a bottom portion and a through bore 80 disposed above the hexagonal recess 74. The hexagonal recess 74 and the through bore 80 fluidly connect the tee portion 38 to an adaptor center portion (or cavity) 81. Fluid may flow in a vertical direction 54 from the tee portion 38, into the adaptor portion 32, through the hexagonal recess 74, through the through bore 80, into the adaptor center portion 81, and finally through an orifice exit 82.

The adaptor portion 32 may be formed by taking a commercially available forged round bar, drilling a first hole all the way through, the first hole having a diameter equal to the diameter of the adaptor center portion (or cavity) 81. The internal threading 78 may then be threaded into the adaptor portion 32. A second hole 84 may then be drilled into the bottom of the adaptor portion 32, but only to a depth of about 10-20% of the adaptor portion height. The second hole 84 may have a diameter that is larger than that of the adaptor center portion 81 and that matches the diameter of the second leg 62 of the tee portion 38 such that fluid may make a smooth transition into the adaptor portion 32. One or more tapered portions 86 may then be machined into the adaptor portion 32 at the bottom and/or the top via milling, drilling, lathe, and/or other suitable machining processes. The inlet portion 34, tee portion 38, access portion 36, and threaded reducing coupling 39 may similarly all include one or more tapered portions 86. In addition, the forged material of the adaptor portion 32 as well as the adaptor portion 32 wall thickness may enable the internal threading 78 to be sufficiently robust to retain the hex socket 76 during operation, as well as to withstand the internal pressures and temperatures during operation.

In operation, a diameter of the through bore 80 may determine the maximum flow rate through the in-line orifice 30 due to the through bore 80 representing the smallest flow area within the orifice 30. Hex sockets 76 may be drilled to have through bores 80 of various diameters such that they produce the desired flow rate therethrough. The hex socket 76 may be tightened and or loosened via the hexagonal recess 74 using an Allen wrench, Torx screwdriver, and/or other tool with a hexagonal and/or rectangular head inserted through the access port 68 and into the hex recess 74. The hex socket 76 may be removed from the orifice 30 via the access port 68, may be repaired, drilled to include a larger diameter through bore 80, cleaned, replaced with another hex socket 76, and/or reinstalled within the internal threading 78 of the adaptor portion 32 via a similar method. In addition, visual access to the hex socket 76 via the access port 68 may allow the hex socket 76 and other internal portions of the orifice 30 to be inspected without requiring that the hex socket 76 be removed. In addition, the orifice 30 may be repaired and/or modified (including modifying and/or replacing the hex socket 76 to achieve a different flow rate) without requiring any welded and/or brazed portions to be cut and/or subsequently rewelded. The outer diameter of the hex socket 76 may be no greater than the internal diameter of the access port 68, thereby enabling the hex socket 76 to pass through the access port 68 during removal and installation. In operation, fluid does not flow out of the access portion 36 due to the plug 66 being securely fastened into the threaded reducing coupling 39.

FIG. 4 illustrates an enlarged view of the adaptor portion 32 without the hex socket 76. The adaptor portion 32 may include the adaptor center portion, the internal threading 78 for interfacing with the external threading 88 (shown in FIG. 5) of the hex socket 76, the second hole 84, the orifice exit 81, as well as one or more tapered portions 86.

FIG. 5 illustrates a perspective view of the hex socket 76 (decoupled from the adaptor portion 32) including external threading 88, the hexagonal recess 74, and the through bore 80 disposed at an opposite end of the hex socket 76 from the hexagonal recess 74.

FIG. 6 illustrates an alternate embodiment of the in-line orifice 30. In the embodiment of FIG. 6, the inlet portion 34 is disposed vertically beneath a central portion 90, which is disposed vertically beneath the adaptor portion 32. Flow enters at an orifice inlet 50 and flows in a vertical direction 54 through the inlet portion 34 and central portion 90 into the adaptor portion 32. Fluid may flow through the hexagonal recess 74 and through bore 80 (both disposed within the hex socket 76) and eventually through the orifice exit 82. In the embodiment of FIG. 6, each of the central portion 90, the inlet portion 34, and the adaptor portion 32 are substantially colinear with each other. The embodiment of FIG. 6 may be desired over the embodiment of FIG. 3 in applications where a tee portion 38 is difficult and/or impossible to accommodate due to spatial constraints. The embodiment of FIG. 3 may be desired over the embodiment of FIG. 6 in applications where having visual and physical access to the hex socket 76 (ad well as the ability to remove and/or replace the hex socket 76) via the access port 68 are desired.

Referring still to FIG. 6, the embodiments disclosed herein may not include either the inlet portion 34 or the central portion 90. For example, in one embodiment, the inlet portion 34 may be coupled directly to the adaptor portion 34 (i.e., and thus there is no central portion 90). In other embodiments, the central portion 90 may act as an inlet portion (and thus there is no inlet portion 34). Each of the inlet portion 34 and the central portion 90 may be extended such that they are longer and/or shorter, as desired based on design and/or installation factors. Embodiments of the in-line orifice 30 that do not include at least one of the inlet portion 34 and the central portion 90 eliminate at least one weld interface, thereby simplifying the assembly and potentially reducing assembly time.

The chamfers 56, 58 and/or recesses 86 of each of FIGS. 3, 4, and 6 may be located at or near the interfaces between components and as such, may aid in welding components together. For example, referring to FIG. 3, the recesses 86 at the interface between the inlet portion 34 and the tee portion 38 (and similarly for the interfaces between the tee portion 38 and each of the access portion 36 and the adaptor portion 32) may allow for a smooth transition between portions, which in turn allows for a favorable target surface on which a weld may be performed, thereby allowing for full penetration welding. In other embodiments, a socket weld tee may be used rather than the recesses 86 and/or chamfers 56, 58. Referring to the embodiment of FIG. 3, each of the inlet portion 34, the access portion 36, and the adaptor portion 32 may include an insert (not shown) at the respective interfaces with the tee portion 34. The inserts slide into the tee portion 34. The interfaces between the tee portion 34 and each of the inlet portion 34, the access portion 36, and the adaptor portion 32 may be subsequently sealed via a fillet weld.

The present embodiments have been described primarily in terms of applications within heat recovery steam generators (HRSG). However, several other applications are possible. Exemplary applications of the present embodiments may include steam turbine generators, HRSGs, boilers, gas turbine generators, rotary engine generators, heat exchangers, automobiles, air-cooled generators, gas-cooled generators, fluidly-cooled generators, three-phase generators, chillers, refrigeration equipment and/or other types of equipment where being able to easily modify an orifice flow rate is desired. The embodiments disclosed herein allow the hex socket 76 to be replaced and/or modified, thereby enabling different flow rates through the in-line orifice 30, without requiring cutting through welds. In addition, the present embodiments enable different flow rates through the in-line orifice 30 without hydro testing and/or chemical cleaning, processes that are time-consuming and are often required following a pressure vessel weld process. The present embodiments enable several hex sockets to be machined to various through bore 80 diameters which in turn enables flow rates at a site to be quickly adjusted and/or fine-tuned on the fly, again without requiring costly and time-consuming weld cuts or subsequent re-welds, chemical cleaning, and/or hydro testing. Sites often require several different flow rates which must be achieved with specificity. The present embodiments enable accurately achieving the desired flow rates without requiring cutting into pressure retaining boundaries, the restoration of which may also require radiographic inspection, and/or post-weld heat treat, in addition to the other processes mentioned above. Each of the in-line orifice embodiments described herein and components thereof may be formed of stainless steel, alloy steel, carbon steel, and/or other suitable materials.

Although specific features of various embodiments of the present disclosure may be shown in some drawings and not in others, this is for convenience only. In accordance with the principles of the present disclosure, any feature of a drawing may be referenced and/or claimed in combination with any feature of any other drawing.

This written description uses examples to disclose the embodiments of the present disclosure, including the best mode, and also to enable any person skilled in the art to practice the disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An adaptor assembly comprising:
an adaptor, comprising:
an outer wall;
a first hole disposed in the outer wall;
a threaded portion disposed in the outer wall; and
a second hole disposed in the outer wall, wherein the threaded portion is disposed axially between the first and second holes; and
a socket comprising external threading, a tool recess disposed within a first end, and a through bore disposed within a second end opposite from the first end, wherein a first diameter of the through bore is smaller than a second diameter of the second hole, the socket is inserted through the second hole and screwed into the adaptor such that the external threading mates with the threaded portion, and the through bore extends into the tool recess.

2. The adaptor assembly of claim 1, wherein the socket comprises a hex socket and the tool recess comprises a hexagonal recess.

3. The adaptor assembly of claim 2, wherein the hexagonal recess of the hex socket is wider than the first diameter of the through bore.

4. The adaptor assembly of claim 1, wherein the tool recess and the through bore are coaxial with one another.

5. The adaptor assembly of claim 1, wherein the external threading extends along an entire axial length of the socket.

6. A system, comprising:
an orifice assembly comprising:
a first portion comprising a first passage;
an adaptor portion comprising a second passage and internal threads;
a socket comprising external threads, an orifice, and a tool recess, wherein the socket is disposed in the adaptor portion along the second passage, such that the external threads of the socket are threadingly coupled to the internal threads of the adaptor portion; and
an access portion comprising a third passage, wherein the second and third passages are coaxial with one another, the first passage is crosswise relative to the second and third passages, the first passage intersects the second and third passages axially between the adaptor portion and the access portion, the tool recess of the socket faces toward the access portion, and the tool recess is configured to receive a tool through the access portion to rotate the socket.

7. The system of claim 6, wherein the socket comprises a hex socket, and the tool recess comprises a hexagonal recess.

8. The system of claim 6, wherein the orifice defines a minimum flow area through the orifice assembly.

9. The system of claim 6, further comprising a tee portion at an intersection of the first, second, and third passages.

10. The system of claim 9, wherein the first passage is orthogonal to the second and third passages.

11. The system of claim 6, wherein the access portion comprises at least one access port.

12. The orifice assembly system of claim 6, wherein the access portion comprises at least one plug.

13. The system of claim 6, wherein the orifice extends into the tool recess, and the tool recess is wider than the orifice.

14. The system of claim 6, wherein the socket is removable from the adaptor portion through the access portion.

15. The system of claim 6, wherein the adaptor portion comprises at least one of carbon steel, alloy steel, stainless steel, and forged materials.

16. The system of claim 6, wherein the first portion comprises an inlet portion configured to route a fluid flow to the adaptor portion.

17. The system of claim 6, comprising a heat recovery steam generator (HRSG) having the orifice assembly.

18. A heat recovery steam generator (HRSG) comprising:
at least one orifice assembly, the at least one orifice assembly comprising:
an adaptor portion, the adaptor portion configured to receive at least one fluid, the adaptor portion further comprising:
a through hole comprising a threaded portion; and
a hex socket comprising external threading, the hex socket further comprising:
a hexagonal recess disposed within a first end of the hex socket; and
a through bore disposed within a second end of the hex socket, the second end at an opposite end of the hex socket from the first end, wherein the through bore extends into the hexagonal recess.

19. The heat recovery steam generator (HRSG) of claim 18, wherein the hex socket screws into the threaded portion such that the external threading mates with the threaded portion.

20. The heat recovery steam generator (HRSG) of claim 18, wherein the HRSG further comprises a drum-less high-pressure system.

* * * * *